TWO-WAY TIME-SHARING RESONANT-TRANSFER COMMUNICATION SYSTEM

Filed June 13, 1967 3 Sheets-Sheet 1

TWO-WAY TIME-SHARING RESONANT-TRANSFER COMMUNICATION SYSTEM

Filed June 13, 1967 3 Sheets-Sheet 2

Ferdinando Formenti
Giuseppe Valbonesi
INVENTORS.

BY

Karl F. Ross
Attorney

TWO-WAY TIME-SHARING RESONANT-TRANSFER COMMUNICATION SYSTEM

Filed June 13, 1967 3 Sheets-Sheet 3

Ferdinando Formenti
Giuseppe Valbonesi
INVENTORS.

BY

Karl F. Ross
Attorney

United States Patent Office 3,499,119
Patented Mar. 3, 1970

3,499,119

TWO-WAY TIME-SHARING RESONANT-TRANSFER COMMUNICATION SYSTEM

Ferdinando Formenti and Giuseppe Valbonesi, Milan, Italy, assignors to Societa Italiana Telecomuniciazioni Siemens S.p.A., Milan, Italy, a corporation of Italy Filed June 13, 1967, Ser. No. 645,685
Claims priority, application Italy, July 15, 1966, 16,470/66
Int. Cl. H04j *3/00*
U.S. Cl. 179—15 4 Claims

ABSTRACT OF THE DISCLOSURE

Communication—especially telephone—system with a plurality of local lines sequentially connectable to a common terminal on each side of a two-way trunk divided into two parallel branches, each branch including a repeater for a respective direction of transmission. A message sample stored on a condenser at the trunk end of any local line is transmitted to a corresponding condenser of the opposite line in two immediately consecutive stages, the first stage involving the charging of an intermediate capacitor of the outgoing trunk branch whereas the second one results in the transfer of that charge to the storage condenser at the remote terminal. At least one of these charge transfers takes place through an amplifier stage of the corresponding repeater by way of impedances designed to provide critical damping for an aperiodic discharge; the other transfer may proceed under resonance conditions and without amplification. Thus, during a sampling interval, the storage condensers of two confronting lines can be concurrently discharged into their respective outgoing trunk branches and thereafter receive amplified message samples from their respective incoming branches.

Figure 1:
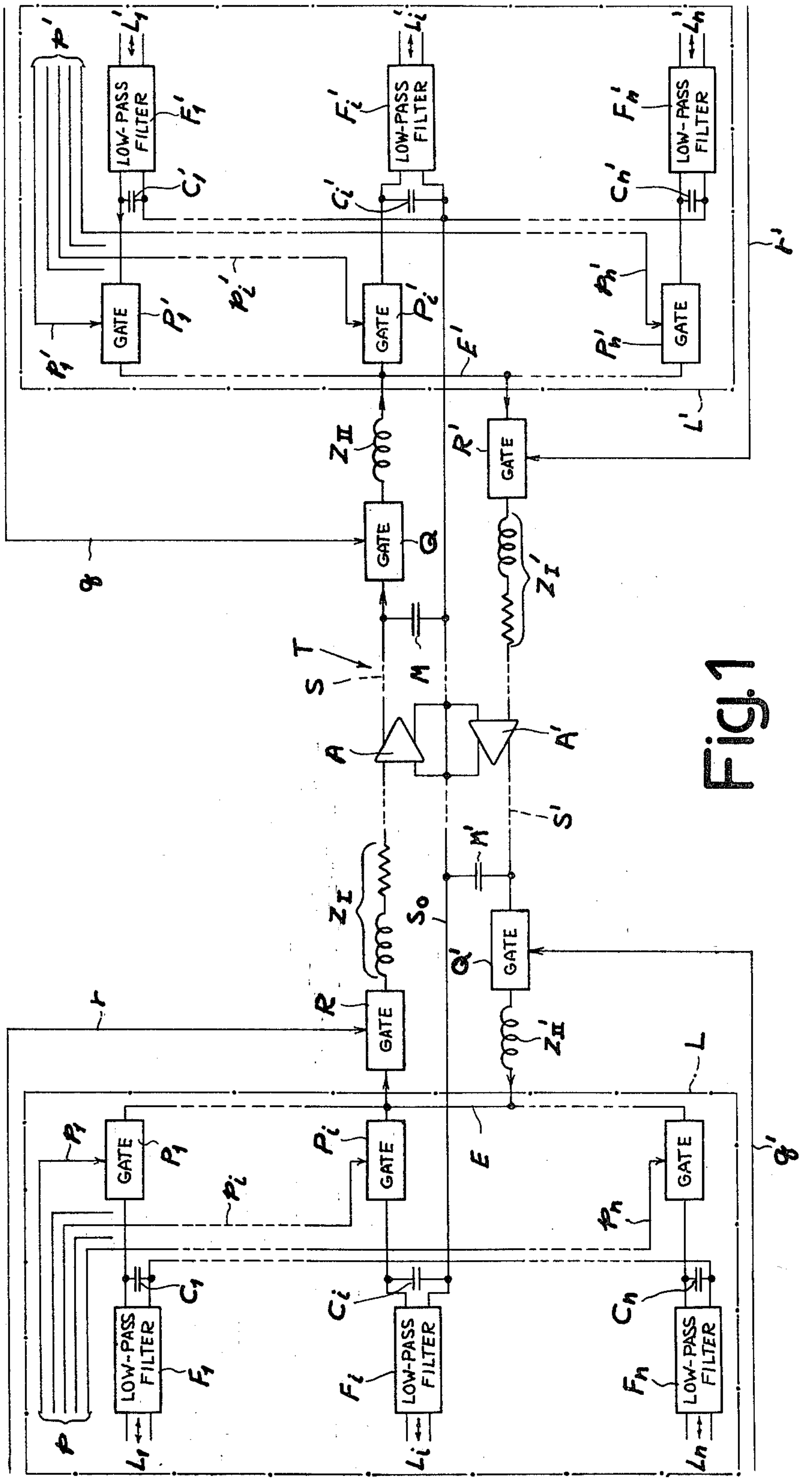

Our present invention relates to a communication system, particularly for the transmission of telephone conversations, in which several local lines at opposite ends of a common trunk transmit and receive messages simultaneously by a time-sharing arrangement including means for periodically sampling a message signal on a storage condenser at the output end of each transmitting line and conveying the sample over the trunk to the input end of an associated receiving line.

If the sample is transmitted as a pulse of constant amplitude, most of the energy generated at the originating line is lost and must be recreated by amplification. This problem is somewhat mitigated by a resonant transfer in which, during the available sampling interval, the current rises and falls sinusoidally as the storage condenser discharges through a tuned circuit including an appropriately dimensioned inductance. Even in this case, however, amplification is often necessary, particularly for transmission over long trunk lines.

An object of our present invention is to provide means in such system for transmitting, with minimum energy losses, message samples between a plurality of simultaneously communicating pairs of subscriber lines multiplexed to a common trunk having one or more repeaters for amplifying the signals in each direction of transmission.

A more particular object of this invention is to provide means for accomplishing such message transmission in a manner permitting use of a common storage condenser (or combination of condensers), at the end of each local line proximal to the associated trunk terminal, for receiving both the outgoing signal from the local line and the incoming signal from the trunk.

These objects are realized, pursuant to our present invention, by the provision of an intermediate condenser (or combination of such condensers) in each branch of the trunk, this intermediate condenser dividing the respective branch into an input section and an output section both containing impedances to control the transfer of a charge from the storage condenser of a transmitting subscriber line to the intermediate condenser and, immediately thereafter, from the latter condenser to the storage condenser of a receiving subscriber line. The two-stage transfer of a message sample, proceeding during a sample interval, also includes amplification of the signal in a repeater connected in at least one of the sections of each branch. At each terminal the two branches of the trunk are connected in parallel for simultaneous coupling, through a timer-controlled bidirectional gate, to the storage condenser of a respective local line. Other gates controlled by the timer enable the concurrent discharge of the two simultaneously accessible storage condensers into the respective intermediate condensers of the trunk during a first part of a sampling interval and the discharge of these intermediate condensers into the respectively opposite storage condensers, remote from the originating stations, in a second part of that interval.

According to a more particular feature of our invention, the transfer impedances of the trunk are so chosen as to provide a substantially critical damping during at least one stage, i.e. a stage in which the discharge current passes through an amplifier of the repeater serving the respective branch of the trunk. The resulting aperiodic discharge of the storage and/or intermediate condensers, during the part of the sampling interval allotted to such discharge, affords the maximum possible energy transfer and minimizes the required current-amplification ratio of the repeater. If only one section of each trunk branch is provided with amplifier means, the transfer in the other section may be made resonant by a suitable selection of the corresponding impedances thereof.

Figure 3A:
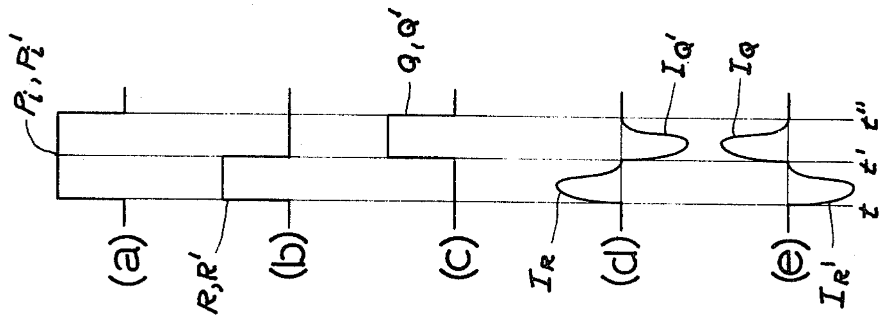
Figure 2A:
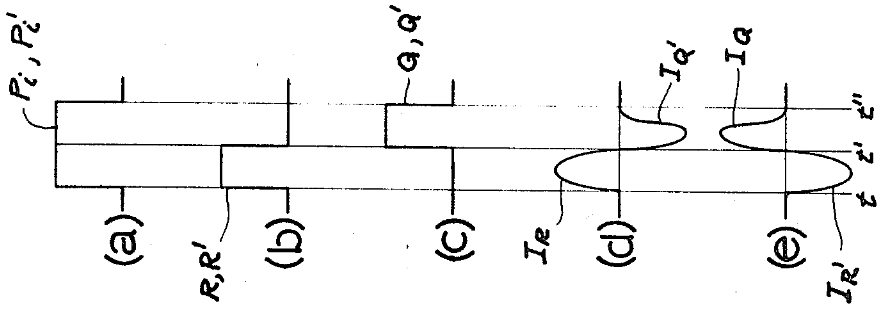
Figure 1A:
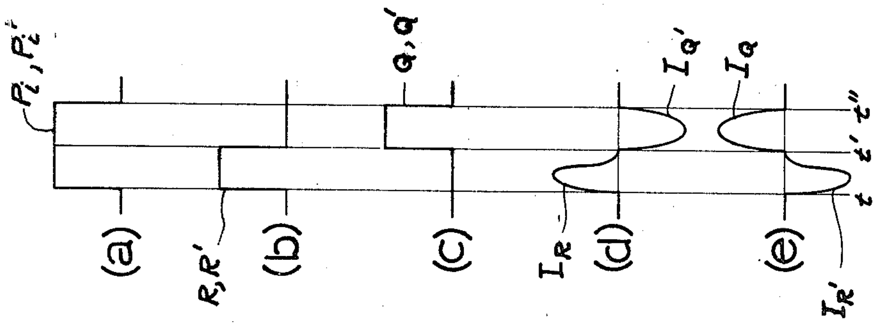
Figure 2:
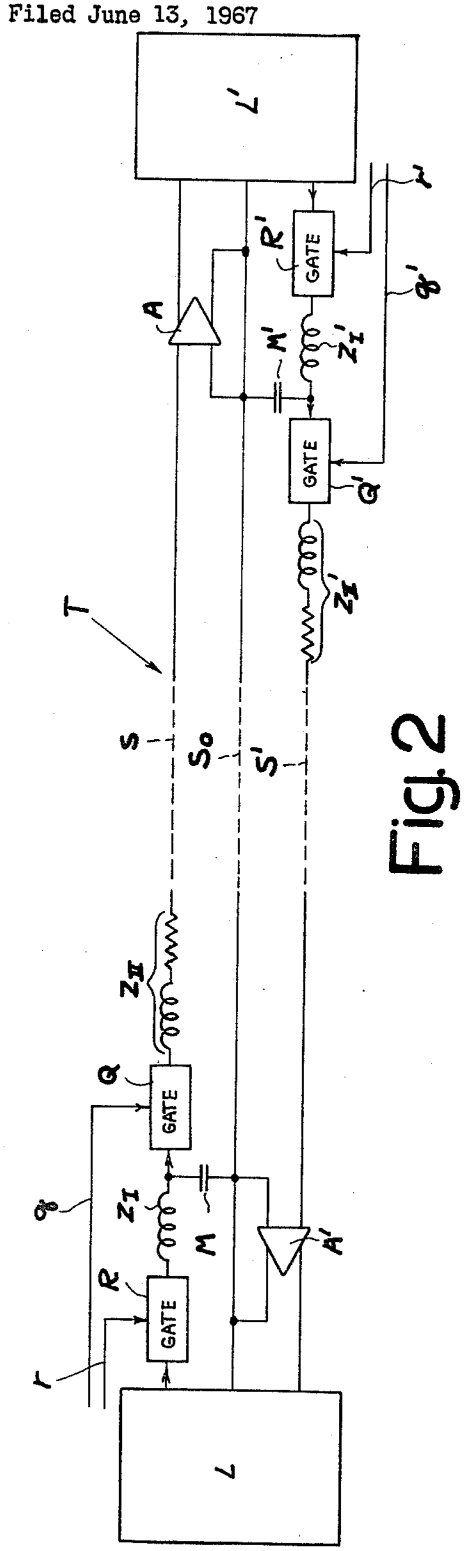
Figure 3:
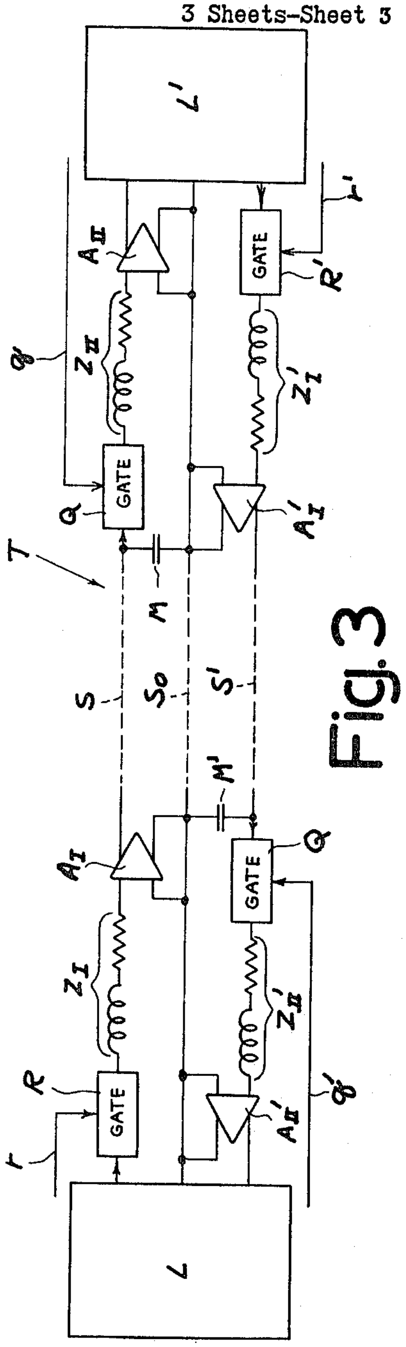

The invention will be described in greater detail with reference to the accompanying drawing in which:

FIGS. 1, 2 and 3 are circuit diagrams illustrating respective telephone communication systems embodying the present improvement; and FIGS. 1A, 2A and 3A are graphs serving to explain the operation of the systems of FIGS. 1, 2 and 3, respectively.

Throughout the drawing, corresponding elements have been designated by identical reference characters.

In FIG. 1 we have diagrammatically illustrated a first plurality of local lines, collectively designated L, and a second plurality of local lines, collectively designated L', between which it is possible to establish concurrent two-way conversations on a time-sharing basis by way of a common trunk T. The local lines L and L' are individually connectable, via cross-bar switches and other conventional telephone-exchange equipment, to individual subscribers in a manner well known per se and not further illustrated. The first line $L_1$, an intermediate line $L_i$ and the last line $L_n$ on the left as well as corresponding lines $L_1'$, $L_i'$, and $L_n'$ on the right have been shown in detail. Each of these local lines terminates, at its end proximal to the trunk T, in a low-pass filter $F_1$, $F_i$, $F_n$ or $F_1'$, $F_i'$, $F_n'$ and a storage condenser $C_1$, $C_i$ $C_n$ or $C_1'$, $C_i'$, $C_n'$ which, of course, could also be representative of a combination of such capacitors.

The trunk T includes a pair of branch conductors S, S' and a common conductor $S_0$ (which may be grounded), the branch leads SC, S' being tied together at their ends E, E' representing the two terminals of the trunk. Access between terminal E and any of the local lines $L_1$, $L_i$, $L_n$ can be had through respective two-way gates $P_1$, $P_i$, $P_n$; similarly, terminal E' is connectable to any of lines $L_1$, $L_i$, $L_n'$ through respective bidirectional gates $P_1'$, $P_i'$, $P_n'$.

These gates, normally blocked, are periodically opened in rapid cyclic succession by respective leads $p_1$, $p_i$, $p_n$ (collectively designated $p$) and $p_1'$, $p_i'$, $p_n'$ (collectively designated $p'$) from a pair of synchronized timers not further illustrated, the open time of each gate representing a sampling interval. The two timers also control the opening and closure of two further gates R, Q in trunk branch S, $S_o$ via respective leaders $r$, $q$ and similar relays R′, Q′ in trunk branch S′, $S_o$ via respective leads $r'$, $q'$.

Each of the two trunk branches includes a repeater, in the form of a one-stage current amplifier A and A′, effective for transmission from left to right and from right to left, respectively. An intermediate condenser M, which may again be representative of a combination of several capacitors, is connected across branch S, $S_o$ beyond amplifier A (i.e. to the right thereof); in analogous manner, an intermediate condenser M′ is connected across branch S′, $S_o$ downstream (i.e. to the left) from amplifier A′.

Condenser M divides the branch S, $S_o$ into an input section, including the gate R and the amplifier A along with an impedance $Z_I$ in the input of the latter, and an output section including gate Q in series with an impedance $Z_{II}$. Similar impedances $Z_I'$ and $Z_{II}'$ are included in corresponding sections of branch S′, $S_o$.

In the embodiment of FIG. 1, impedances $Z_I$, $Z_I'$ are shown as being both inductive and resistive and are designed to provide critical damping for a discharge of condensers $C_1$, $C_i'$ (or corresponding condensers of the other local lines), in the open conditions of gates $P_i$, R and $P_i'$, R′, through the input circuit of the respective amplifiers A and A′, taking into consideration the input impedances of the amplifiers and the line impedances of the corresponding trunk sections. Impedances $Z_{II}$ and $Z_{II}'$, on the other hand, are substantially purely inductive to provide for a resonant discharge of condensers M and M′ in the open conditions of gates Q and Q′.

The operation of the system of FIG, 1 will now be described with reference to FIG. 1A.

When, in the course of an operating cycle of the two synchronized timers, a pair of gates such as $P_i$, $P_i'$ are unblocked whose subscriber lines (e.g. $L_i$, $L_i'$) have messages to transmit to each other, the corresponding storage condensers $C_i$, $C_i'$ carry charges whose magnitudes correspond to the instantaneous amplitudes of respective signal waves passed by Filters $F_i$ and $F_i'$. The corresponding unblocking pulse, shown at graph (a) of FIG. 1A, lasts for a time $t$–$t''$ representing a sampling interval. Concurrently therewith, pulses are transmitted over leads $r$, $r'$ to open the gates R, R′ as indicated in graph (b), these pulses lasting only for a period $t$–$t'$ representing a fraction of the aforementioned sampling interval. At that point, condenser $C_i$ discharges through gates $P_i$ and R, impedance $Z_I$ and the input circuit of amplifier A, the resulting current $L_R$ being indicated in graph (d) of FIG. 1 and following an aperiodic curve due to critical damping. At the same time, condenser $C_i'$ discharges through gates $P_i'$ and R′, impedance $Z_I'$ and the input circuit of amplifier A′ with a similar current $I_R'$, as shown in graph (e). Immediately thereafter, beginning at instant $t'$, gates R and R′ are closed and gates Q and Q′ are opened by respective pulses on leads $q$ and $q'$, lasting until time $t''$, was indicated in graph (c). Condenser M, which during the period $t$–$t'$ was aperiodically charged by an amplified replica of current $I_R$, now discharges through gate Q and inductance $Z_{II}$ into the previously discharged storage condenser $C_i'$ which has not had time to acquire an appreciable outgoing charge through filter $F_i'$; this current, designated $L_q$, follows one half-cycle of or resonant curve of period $2(t''$–$t')$ as seen in graph (e) of FIG. 1A. Simultaneously, condenser M′ transfers its previously acquired charge by a similar current flow $I_Q$, to condenser $C_i$ as illustrated in graph (d). The polarities shown in graphs (d) and (e) represent the direction of current flow, shown positive when passing from left to right in FIG. 1.

During the ensuing timer cycle, the new charges on condensers $C_i$ and $C_i'$ are dissipated through filters $F_i$ and $F_i'$ in the form of signal waves traveling toward the associated subscribers. If either subscriber continues talking, his voice currents will recharge the respective storage condenser in time for the next sampling interval.

In FIG. 2 we have illustrated a modification of the system of FIG. 1 which differs from the latter in that the amplifiers A and A′ have been shifted into the output sections of their respective trunk branches S, $S_o$ and S′, $S_o'$. At the same time, the impedances $Z_{II}$ and $Z_{II}'$ in series with the inputs of these amplifiers have been made partly resistive, in order to provide critical damping, whereas the impedances $Z_I$, $Z_I'$ are now substantially purely inductive to afford a resonant discharge. The shape of currents $I_R$, $I_R'$, $I_Q$, $I_Q'$ has been illustrated in graphs (d) and (e) of FIG. 2A and represents an inversion of the relationship shown in FIG. 1A; graphs (a) (b) and (c) of FIG. 2A (as well as of FIG. 3A described hereinafter) are the same as in FIG. 1A.

In FIG. 3 we have shown the repeater of each trunk branch as a two-stage amplifier, with a first stage $A_I$, $A_I'$ in the input section and a second stage $A_{II}$, $A_{II}'$ in the output section of the respective branch. In this instance, each of the series impedances $Z_I$, $Z_I'$, $Z_{II}$, $Z_{II}'$ is partly ohmic to insure critical damping as illustrated in graphs (d) and (e) of FIG. 3A.

We claim:

1. A communication system comprising a first plurality of local lines ending at a common first terminal; a second plurality of local lines ending at a common second terminal; a two-way trunk with two parallel branches extending between said terminals; a first storage condenser connected across each line of said first plurality, at the end thereof proximal to said first terminal, for charging by message signals to be transmitted to said second terminal via one of said branches; a second storage condenser connected across each line of said second plurality, at the end thereof proximal to said second terminal, for charging by message signals to be transmitted to said first terminal via the other of said branches; a first intemediate condenser connected across said one of said branches; a second intermediate condenser connected across said other of said branches; first repeater means connected in said one of said branches between said first intermediate condenser and at least one of said terminals for the amplification of signals transmitted from said first terminal to said second terminal; second repeater means connected in said other of said branches between said second intermediate condenser and at least one of said terminals for the amplification of signals transmitted from said second terminal to said first terminal; a set of first gates at said first terminal each connected to a respective line of said first plurality for establishing a two-way connection between said first storage condenser thereof and said trunk; a set of second gates at said second terminal each connected to a respective line of said second plurality for establishing a two-way connection between said second storage condenser thereof and said trunk; a third gate in an input section of said one of said branches for establishing a one-way connection from said first terminal to said first intermediate condenser; a fourth gate in an output section of said one of said branches for establishing a one-way connection from said first intermediate condenser to said second terminal; a fifth gate in an input section of said other of said branches for establishing a one-way connection from said second terminal to said second intermediate condenser; a sizth gate in an output section of said other of said branches for establishing a one-way connection from said second intermediate condenser to said first terminal; and timer means for sequentially opening, during respective sampling intervals, said first and second gates to establish communication between corresponding lines of said first and second pluralities, and for concurrently opening said third and fifth gates during a first part of each sampling interval and said fourth and sixth gates during a second part of each sampling interval whereby message samples from the storage condensers of the communicating lines are transferred to said intermediate condensers during said first part and transferred to the opposite storage condensers during said second part, with amplification of each message sample in the course of at least one transfer.

2. A communication system as defined in claim 1, further comprising impedance means connected in series with said repeater means in each of said branches for substantially critically damping the transfer of message signals by way of said repeater means.

3. A communication system as defined in claim 2 wherein each of said repeater means comprises an amplifier in only one section of the respective branch, the other section thereof including impedance means dimensioned for a resonant transfer of a message sample within the allotted part of a sampling interval.

4. A communication system as defined in claim 2 wherein each of said repeater means comprises an amplifier stage in each section of the respective branch, said impedance means being included in each section of each branch for substantially critically damping the transfer of message samples in both parts of a sampling interval.

References Cited

UNITED STATES PATENTS

| | | |
|---|---|---|
| 3,061,681 | 10/1962 | Richards. |
| 3,251,946 | 5/1966 | Pfleiderer. |

FOREIGN PATENTS

| | | |
|---|---|---|
| 1,120,492 | 7/1968 | Great Britain. |

RALPH D. BLAKESLEE, Primary Examiner